United States Patent [19]

Swogger

[11] 3,915,427
[45] Oct. 28, 1975

[54] FLUID CONTROL SYSTEM
[75] Inventor: Emery C. Swogger, Arlington, Tex.
[73] Assignee: LTV Aerospace Corporation, Dallas, Tex.
[22] Filed: Aug. 24, 1973
[21] Appl. No.: 391,173

[52] U.S. Cl. ................... 251/31; 91/3; 91/363 A; 91/411 R; 91/411 A; 137/625.63; 137/625.64; 244/78
[51] Int. Cl.² .................... F15B 13/08; F15B 20/00
[58] Field of Search ...... 91/3, 363 A, 411 R, 411 A; 137/83, 625.6, 625.61, 625.62, 625.63, 625.64; 244/78; 251/31

[56] References Cited
UNITED STATES PATENTS
3,540,350  11/1970  Heine ............................ 91/363 A X
3,618,470  11/1971  Mueller et al. ............... 91/363 A X
3,823,729   7/1974  Swogger ......................... 137/100

Primary Examiner—Alan Cohan
Assistant Examiner—Gerald A. Michalsky
Attorney, Agent, or Firm—J. M. Cate; H. C. Goldwire

[57] ABSTRACT

A fluid-powered control system of a type employing redundant control channels and multiple fluid signal amplifiers. Each fluid amplifier has two fluid outlets having communication with respective portions of a movable, force summing structure but having no communication with the other amplifiers. A respective, differential pressure monitoring means is connected between a source of fluid under pressure and each fluid amplifier and is operative to shut off fluid flow to the respective, associated, fluid amplifier upon the occurrence, across the outlets of the fluid amplifier, of a differential pressure exceeding a predetermined level.

6 Claims, 6 Drawing Figures

FLUID CONTROL SYSTEM

This invention relates to fluid-powered control systems and, more particularly, to a fluid control system having a plurality of redundant fluid amplifiers.

Fluid powered control systems having multiple, redundant control channels have been proposed for various applications in which reliability is of great importance, such as avionic systems including "fly-by-wire" servo control actuator systems. It is desirable in such systems to eliminate lengthy mechanical linkges, push rods, and the like extending between a control station and a remotely controlled actuator system because such linkages have a degree of flexibility which may distort a given input signal, and because their mass may become a limiting factor when rapidly changing signals are to be transmitted. While present aircraft are designed in such a manner that they normally tend to remain relatively stable in flight, proposed aircraft, known in the art as "control configured vehicles," incorporate certain aerodynamic configurations which, while providing improvements in performance and operating efficiency, result in a decrease in inherent flight stability; they therefore require control systems having extremely rapid response times not practically obtainable with mechanical control linkages. Thus, the use of fly-by-wire systems has been proposed wherein electromechanical "command" transducer are controlled automatically or by an operator for generating electrical command signals which are transmitted to a remote, servo control system by means of wires rather than mechanical linkages. The servo control systems employ input transducers to convert the electrical control signals into corresponding mechanical or fluidic signals, which may be amplified and then employed, for example, to effect a commanded translation of a movable element such as an aircraft control surface structure. Electrical transducers, sensors, and the like required in such servo systems, however, are susceptible to malfunctions and failure from various causes and often do not have the very high level of reliability required in the control systems of aircraft or space vehicles. To compensate for the unacceptable level of reliability of such electrical components, as well as that of some non-electrical components, redundant control channels are employed, and various techniques of "majority voting" of multiple components have been devised wherein failed or inoperative control channels are outvoted or overpowered by the remaining channels.

Integration of the outputs of a plurality of redundant channels in a control system may be accomplished by summing the signals of each channel. Conventionally, a plurality of electrical cables from a command station transmit to a servo system a corresponding plurality of redundant, electrical command signals which, as has been suggested, may correspond to the desired position to which a movable element, e.g., an aircraft control surface element, is to be moved. As will be described more fully in the detailed description of the invention, each command signal may then be amplified within the control system, correlated with a position feedback signal corresponding to the current position of the movable element, and the appropriate corrective signal then supplied to a respective one of a plurality of signal amplifiers. These amplifiers are typically of the electrohydraulic transducer type producing fluid output signals through two outlets at pressures and/or flow rates which may vary differentially with respect to each other in response to the respective electrical input signal. It is at this stage that the redundant signals are normally integrated and at which majority voting is accomplished. The hydraulic output signals of the transducers may be "summed" by employing a movable piston structure having oppositely directioned piston face areas, the output portions of the multiple transducers having their respective fluid outlets interconnected with the outlets of like sense of the other transducers, the interconnected outlets of one sense having communication with a respective piston face on the movalbe structure and the interconnected outlets of the opposite sense having communication with a corresponding but oppositely directional piston face. The electrohydraulic transducers may be of the well-known, flapper type, in which case their nozzles are connected in parallel with each other and with the two piston face areas of the summing structure effectively averaging the differential pressures and flows across the fluid outlets of the transducers. Or, other types of fluid amplifiers may be employed in parallel. In all such cases wherein there is fluid communication between the outlets of the fluid amplifiers, however, there exists the disadvantage that should a leak, or a flow stoppage or restriction, occur in any of the conduits or passageways through which fluid pressure is communicated from the amplifiers to the movable summing structure, the output of the entire system is directly affected and the system may malfunction or become inoperative. Such problems are minimized by a second summing method, which will be termed herein the "force summing method," and in which each of the amplifier fluid outlets of a given sense has communication with a respective one of a plurality of piston face areas formed on the movable summing structure and facing in a first direction, and each of the fluid outlets of the opposite sense has communication with one of a second plurality of piston face areas facing in a second, opposite direction. Fluid amplifiers of the type known as jet pipe, electro-hydraulic valves may be employed in such systems and incorporate a fluid supply of constant flow rate which is ejected through a jet nozzle movably mounted in a manner which permits the ejected flow to be directed into either of two outlets or to be proportionally divided therebetween. In any of the systems, a feedback system, such as a mechanical spring element, is preferably connected between each respective fluid amplifier movable element and the summing structure. The feedback elements, as will be more fully described hereinbelow, serve to minimize the output of any amplifier which is in substantial disagreement with the signals of the remaining channels by averaging the signals of all the channels.

Voting may be accomplished by averaging the output signals of the amplifiers, those channels which are out of agreement with the remaining channels being substantially overpowered thereby. In such systems, however, there remains an erroneous bias upon the amplifiers of the remaining channels (presumably the correctly operating channels), which results in an averaged output signal at least somewhat deviated from the commanded signal. Moreover, if a subsequent failure of one or more of the other amplifiers occurs of a nature causing a deviation in output of the same sense as that of the first failure, the erroneous signals are then accumulated, and the system output is distored by both erroneous signals.

Because of this limitation with respect to system response after multiple failures, it may be necessary, in systems in which a high degree of reliability is required, to incorporate monitoring and valving mechanisms operable to sense an abnormal condition in any of the channels and to deactivate or isolate an abnormal channel from the remaining channels. Some relatively complex systems employ sensing and valving devices operative to compare the output of each of a plurality of redundant components, such as transducers or amplifiers, with that of the remaining such components. It can thus be seen that in a system employing a given number "$n$" of channels, a minimum number of comparators given by the series $[(n-1) + (n-2) \ldots (n-n)]$ are needed for such an approach. Moreover, if it is desired to completely isolate the fluid output signal of the failed channel from the remaining channels interconnected therewith, an undesirably large number of valves, corresponding to the number of passageways interconnected between the several amplifiers, must be provided, or the fluid supplied to each amplifier must pass through $n-1$ shut off valves prior to entering that amplifier. A further problem with some such systems is that inoperative fluid amplifiers may impart an undesirably great load or drag opposing any movement of the movable member. This occurs because the fluid pressure control segment of some such amplifiers incorporate restrictive orifices or nozzles through which fluid must pass when the movable summing structure is moved. Furthermore, is those redundant channel control systems employing multiple electrohydraulic transducers whose outputs are interconnected with those of other transducers, monitoring of the fluid pressures at the output stages of the individual transducers is made difficult or impossible because a change in pressure at one transducer tends to distort the fluid output of the other transducers.

It is, therefore, a major object of the present invention to provide a new and improved fluid-powered control system of the type having a plurality of redundant fluid amplifiers.

Another object is to provide such a control system in which fluid outlet pressures of the respective fluid amplifiers are mechanically summed by means of a movable summing structure and wherein no fluid communication is permitted between fluid outlets of respective fluid amplifiers.

A further object is to provide such a control system wherein differential pressure signals produced by the respective fluid amplifiers are discretely monitored, and wherein the fluid supply to any of the fluid amplifiers is shut off upon the occurrence of a differential pressure across its outlets which exceeds a predetermined value.

A still further object is to provide such a control system capable of extremely rapid response.

Yet another object is to provide such a control system having a movable summing structure which is operatively connected to the valve element of a power amplifying, hydraulic flow control valve.

Another major object is to provide such a control system in which the flow control valve is fluidly connected to drive an actuator and is operable to control the velocity of movement of a load driven by the actuator.

Another object is to provide such a control system in which the degradation in performance is minimal after successive signal channel failures.

Still another object is to provide such a control system in which the performance is only briefly degraded after a channel has failed before that channel has been deactivated or isolated from the remaining channels, and a system in which the transient condition caused by a failure and the transient caused by deactivating that channel is minimized.

Other objects and advantages will be apparent from the specification and claims and from the accompanying drawing illustrative of the invention.

Figure 1:
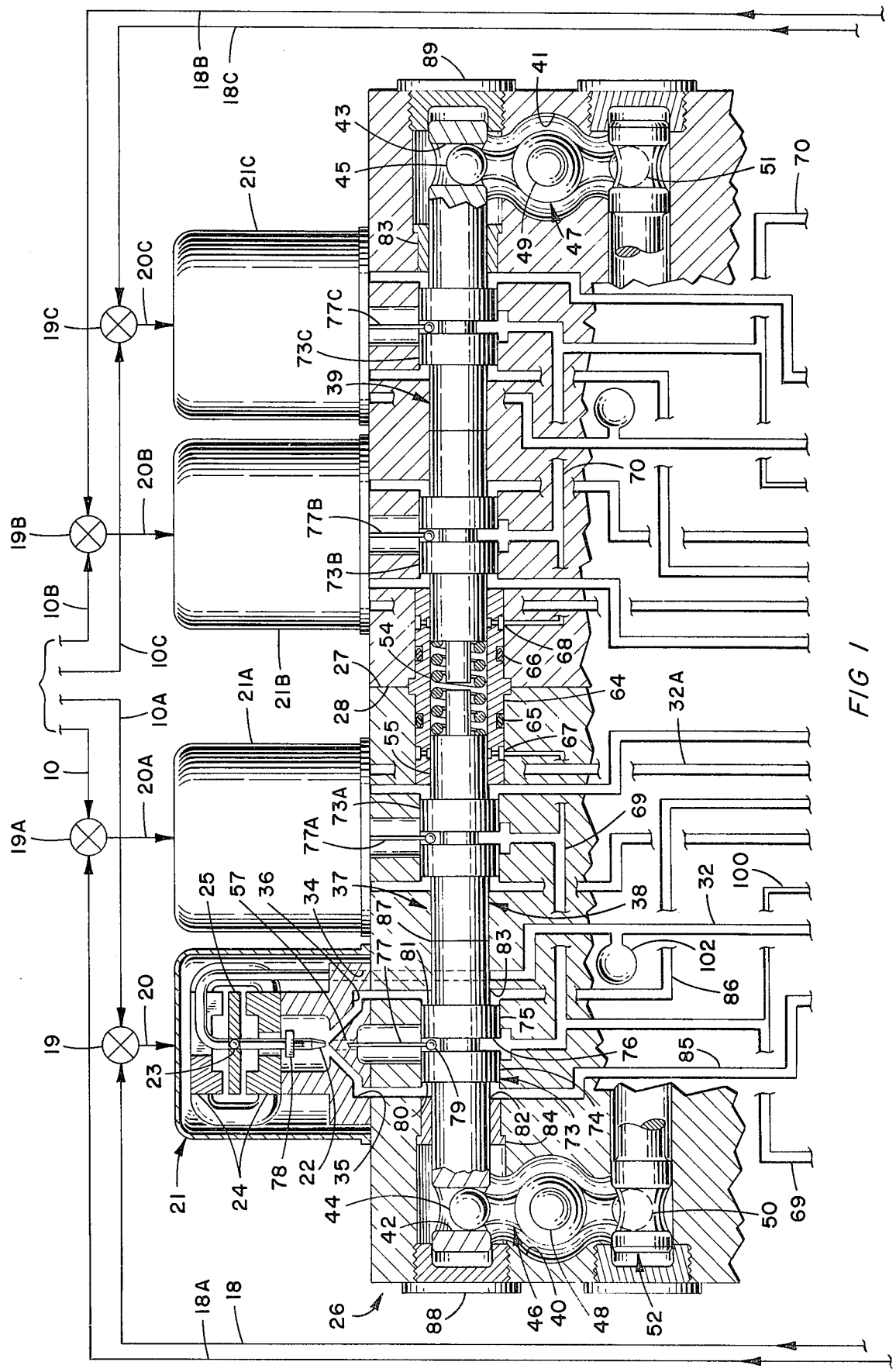
FIG. 1 is a diagrammatic view of a portion of a redundant channel control system constructed according to a preferred embodiment of the present invention, FIG. 1 constituting the upper portion of a three-sheet diagram of the system.

With initial reference to FIG. 1, the control system, identified herein with reference to the system housing 26 to be described, is electrically connected to a remote command station, not shown, via multiple input cables 10, 10A, 10B, and 10C. For illustrative purposes, the control system (26) will be described with respect to its application in an aircraft control system of the "fly-by-wire" type wherein the command station to which redundant input cables 10, 10A, 10B, and 10C extend includes an electromechanical transducer continuously positioned or controlled by the pilot or by an automated, flight control system. The control system (26) of the present invention is employed as a servo system having a duplex hydraulic actuator 11 (FIG. 3), having dual pistons 12 and 13 connected by a piston rod 14 for positioning a load, not shown, such as an airfoil or other movable element. In such an application, the actuator piston rod 14 is drivingly connected to the airfoil suitably by means of a linkage, not shown, attached to a fastening lug 15 mounted on the projecting, distal end of the piston rod 14.

An electromechanical, position sensor system 16 is mounted on the actuator 11 and has axially movable connecting rods 17 extending from the sensor in parallel alignment with the actuator piston rod 14, the distal ends of the connecting rods 17 suitably being fastened to the connecting lug 15 of the piston rod 14 whereby the connecting rods 17 are axially movable in unison with the piston rod 14. The construction and operation of such electromechanical position sensors is well known, and they essentially comprise electromagnetic transducers operable to produce an electrical signal proportional to the position of a movable element. In the present embodiment, four signals are required, and a sensor system of the linear variable differential transformer type having four sensor elements similar to that available from the G. L. Collins Corp. under part no. LMT199V15 is suitable. Such a sensor system 16 includes four transducer elements, not shown, for producing redundant position signals, first, second, third and fourth position feedback wires 18, 18A, 18B, and 18C being respectively connected to the transducer elements. First, second, third, and fourth difference signal amplifiers 19, 19A, 19B, and 19C, of a generally known type, are connected to the first, second, third, and fourth position feedback wires 18, 18A, 18B, and 18C, respectively, and to the first, second, third, and fourth input cables 10, 10A, 10B, and 10C, respectively. According to principles known to those in the art, the difference signal amplifiers are each operable to compare the command signal received through the respective, associated input cable 10, 10A, 10B, or 10C with the position signal received through the corresponding feedback wire 18, 18A, 18B, or 18C, respectively. Each difference signal amplifier 19, 19A, 19B, and 19C is operable to produce an electrical "error signal" which is proportional to the difference between the commanded, position signal received through the respective, associated input cable 10, 10A, 10B, or 10C and the position signal received through the corresponding, respective, feedback wire 18, 18A, 18B, or 18C, according to methods generally known in the art of servo control mechanisms. The difference signal amplifiers 19, 19A, 19B, and 19C amplify the difference signals somewhat, and additional amplifying circuits (not shown) may also be provided in series therewith.

The redundant command signals received through the input cables 10, 10A, 10B, and 10C, integrated with the feedback signals received through feedback wires 18, 18A, 18B, and 18C, respectively, are then fed through output leads 20, 20A, 20B, and 20C.

First, second, third, and fourth fluid amplifiers 21, 21A, 21B, and 21C, suitably of the type manufactured by the Abex, Corp. under part no. VQ72-0297-1, have their input terminals connected to output leads 20, 20A, 20B, and 20C, respectively. The fluid amplifiers 21, 21A, 21B, and 21C, in the present embodiment, each comprises an electrohydraulic transducer and signal amplifier of the type known in the art as a "jet pipe valve." In the description to follow, only the first fluid amplifier 21 and its associated elements throughout the system 26 will be described, it being understood that the other control channels are substantially identical. The construction of such a fluid amplifier 21 is known in the art and it is thus illustrated diagrammatically and described herein only summarily. Internally, the amplifier 21 includes a fluid nozzle or jet pipe 22 which is pivotally mounted upon an axle 23 (extending perpendicularly of the sheet of the drawing). A fixed electromagnetic assembly 24 is electrically connected between a ground and the output wire 20 and is arranged to react magnetically with a movable magnet structure 25 affixed to the jet pipe 22 for causing pivotal movement of the jet pipe upon axle 23 in response to any electrical "command" signal received from difference signal amplifier 19.

A system housing 26 is provided and is preferably divided into first and second, contiguous housing segments 27, 28 suitably having a planar interface. As will become apparent, the division of the housing 26 into two segments 27, 28 is a means for preventing total failure of the system should the housing 26 be damaged in such a manner that a crack develops and tends to progress through the housing. Such a crack or rip will be stopped at the interface of the housing segments 27, 28. The fluid amplifiers 21, 21A, 21B, and 21C are mounted upon a flat, external surface of the housing 26, the first and second amplifiers 21, 21A being seated upon the first housing segment 27 and the third and fourth amplifiers 21B, 21C being similarly mounted upon the second housing segment 28, the amplifiers being mutually spaced in side-by-side alignment along an axis extending perpendicularly of the interface of housing segments 27, 28.

A source, not shown, of fluid under pressure, suitably hydraulic fluid, is provided and, in the present embodiment, first and second fluid supply inlets 29, 30, represented diagrammatically as pressure sources $P_1$ and $P_2$, respectively, are provided in the first and second housing segments 27, 28, respectively, in communication with the fluid source. The first fluid source 29 has communication with first and second, electromagnetically controllable shutoff valves 31, 31A (FIG. 2), suitably of the type manufactured by the Sterer Engineering & Manufacturing Co. under part no. 50030. The shutoff valves 31, 31A are normally open to permit fluid flow therethrough, but may be activated to shut off fluid flow by an electrical signal. In the present embodiment, a remote control switch and power source, not shown, are installed in the aircraft cockpit for providing remote control of the shutoff valves 31, 31A. First and second fluid supply passageways or conduits 32 and 32A communicate with the fluid source 29 through the first and second shutoff valves 31, 31A, respectively, and also extend through the first housing segment 27, through first and second, normally open monitor valves 33, 33A, respectively, (to be described) to the first and second fluid amplifiers 21, 21A, respectively. Similarly, third and fourth fluid supply conduits 32B and 32C communicate with the second fluid source 30 through the third and fourth shutoff valves 31B, 31C, respectively, and extend through the second housing segment 28, through the third and fourth monitor valves 33B, 33C, respectively, to the third and fourth fluid amplifiers 21B, 21C, respectively. Fluid sources $P_1$ and $P_2$ are effective to supply a continuous fluid flow to the fluid amplifiers 21, 21A, 21B, 21C unless the supply conduits 32, 32A, 32B, 32C are closed by the shutoff valves 31, 31A, 31B, 31C, respectively, or by the monitor valves 33, 33A, 33B, 33C, respectively. While fluid sources $P_1$ and $P_2$ will be discussed herein as sources of hydraulic fluid, it should be understood that the system 26 may employ gases, as well as other liquids, in a similar manner.

With respect again to the first fluid amplifier 21 as typical of the amplifiers 21A, 21B, and 21C, a fluid inlet 34 of the amplifier 21 has communication with the first supply conduit 32 and with the jet nozzle 22 of the fluid amplifier 21. First and second, mutually divergent, fluid outlets 35, 36 are arranged to receive fluid ejected through the jet nozzle 22, the nozzle structure 22 being pivotally mounted to permit ejection of fluid predominately through either outlet or in a desired proportion through both outlets 35, 36 to cause a differential pressure signal across the outlets and/or a differential fluid flow into the outlets corresponding to the respective electrical command signal received by the amplifier 21 through lead 20.

A movable structure 37, comprising first and second, mutually spaced, elongated structures 38, 39 arranged in longitudinal alignment and in tandem, is slidably mounted within corresponding chamber portions formed within the housing 26 along an axis extending parallel to the axis upon which the amplifiers 21, 21A, 21B, 21C are aligned. The outermost ends of the movable structure 37 extends within respective cavities 40, 41 formed within the first and second housing segments 27, 28, respectively, and have respective bearing sockets 42, 43 formed therein for rotatably and transversely slideably receiving respective spherical end portions 44, 45 of first and second rocker arms 46, 47. The rocker arms 46, 47 are pivotably mounted on the housing 26 upon respective bearing assemblies 48, 49 seated on portions of the housing segments 27, 28, respectively, and arranged to permit rotational movement of the rocker arms 46, 47 about respective axes extending centrally through the respective rocker arms 46, 47, and perpendicularly of the longitudinal axis of the movable structure 37. The opposite ends of the rocker arms 46, 47 similarly define third and fourth, spherical end portions 50, 51, respectively. The third and fourth spherical end portions 50, 51 are rotatably and slideably seated in corresponding sockets or cavities, similar to the sockets 42, 43, formed in respective, adjacent end portions of an axially movable, elongated valve element 52 (the mid-portion of which is shown in FIG. 3) which comprises the slidable spool element of a flow control valve 53 (FIG. 3), to be described below.

Figure 2:
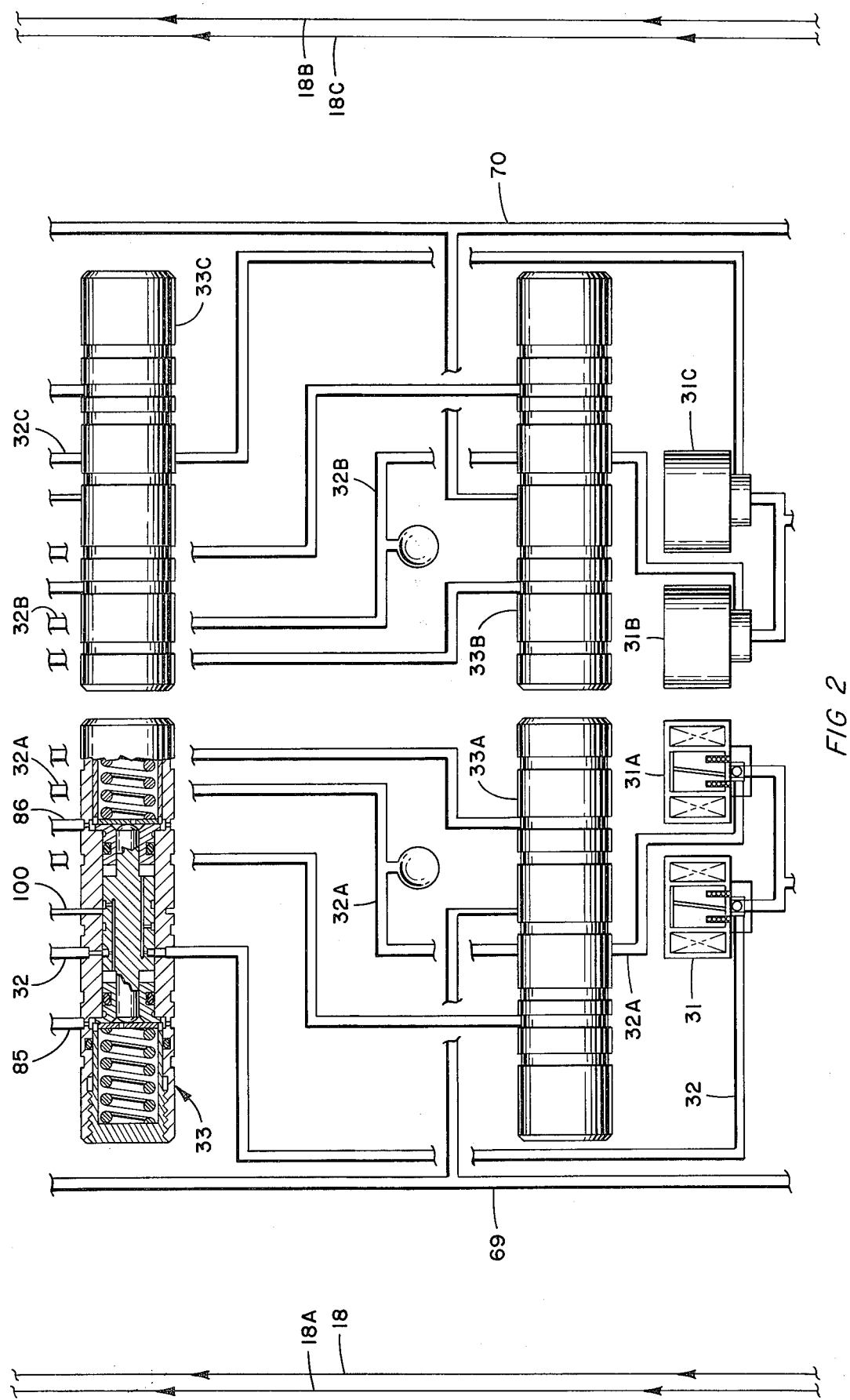
FIG. 2 is a continuation of FIG. 1, constituting the center portion of the diagram.
Figure 3:
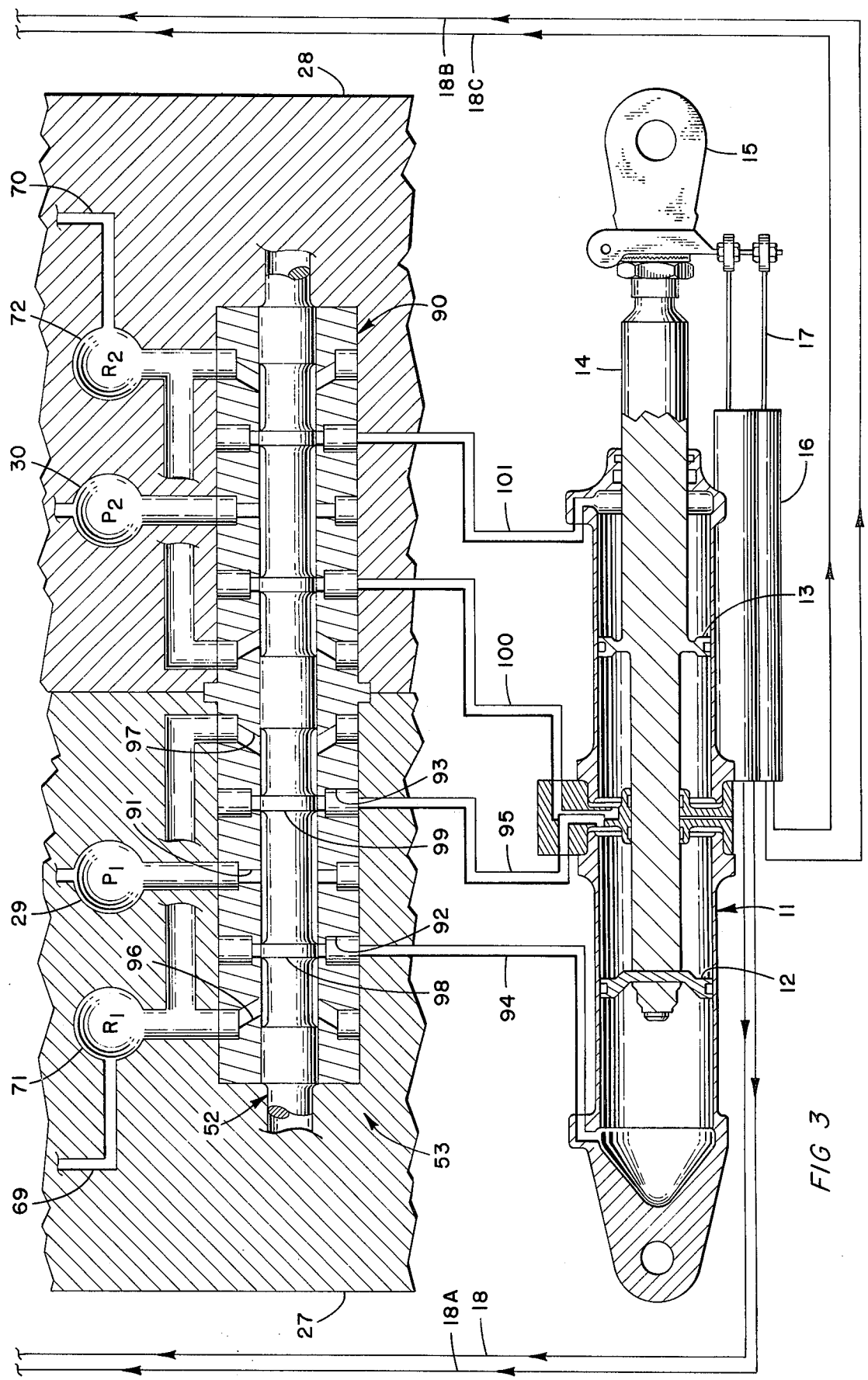
FIG. 3 is a continuation of FIGS. 1 and 2 and constitutes the lower portion of the diagram.

For clarity of illustration, the control system 26 has been diagrammatically illustrated, in FIGS. 1-3, as extending predominately in the plane of the drawing, or in only two dimensions. In its preferred form of construction, however, those portions of the fluid system 26 shown in FIGS. 1-3 as extending between the movable summing structure 37 (FIG. 1) and the flow control valve 53 (FIG. 3) are positioned in a plane beneath or above the plane of the drawing, e.g., behind the summing structure 37 and the flow control valve 53.

The movable summing structure 37 is formed of the two, elongated segments or structures 38, 39, consistent with the construction of the housing 26 in two segments 27, 28, in order to permit, as a safety measure, complete fluid isolation of all components in one housing segment 27 from those in the other segment 28. The two elongated structures 38, 39 have their confronting ends footed against a compressed, coil spring 54 which urges the elongated structures 38, 39 apart, thus keeping the elements firmly seated against the rocker arms 46, 47; in turn keeping the rocker arms firmly seated against the valve element 52; and thus causing the two elongated structures 38, 39, to remain equally spaced unless the spring 54 is further compressed by excessive differential pressures on the piston faces of piston structures 73, 73A, 73B, and 73C, to be described. To prevent any leakage of fluid at the interface of the housing segments 27, 28 adjacent the two elongated structures 38, 39, and for convenience of construction, the mutually adjacent end portions of the elongated structures 38, 39 each are formed with respective stepped, mutually coaxial, first and second, cylindrical portions 55, 56 of reduced diameter, the second portions 56 being of relatively smaller diameter than the first portions, extending from the respective first portions 55 centrally within the coil spring 54 but having end portions spaced to permit a small degree of relative longitudinal movement of the elongated structures 38, 39.

The stepped, first cylindrical end portions 55 of the first and second elongated structures 38, 39 extend slideably within opposite ends of a generally cylindrical, tubular sleeve member 64 which extends equidistantly within corresponding, mutually contiguous, cylindrical cavities extending within the respective houisng segments 27, 28, the sleeve member 64 being sealingly associated with the housing segments by first and second, O-ring seals 65, 66 seated circumferentially around the sleeve adjacent the first and second housing segments 27, 28, respectively. The coil spring 54 thus extends coaxially within the sleeve 64. First and second drainage ducts 67, 68 are formed through the sleeve member 64 at locations thereon spaced longitudinally outwardly of the first and second seals 65, 66 and have communication with respective, first and second, fluid return passageways 69, 70 which communicate with respective fluid return or drainage outlets 71, 72 (FIG. 3) in the first and second housing segments 27, 28, respectively.

The movable summing structure 37 is provided with first, second, third, and fourth, mutually spaced piston structures 73, 73A, 73B, and 73C which are respectively positioned adjacent the first, second, third, and fourth fluid amplifiers 21, 21A, 21B, and 21C. With respect to the first piston structure 73, as typical, the piston structure 73 includes first and second pistons 74, 75, suitably formed as cylindrical, mutually spaced, radially projecting portions of the first elongated structure 38. An annular groove 76 is defined between the first and second pistons 74, 75 and, upon the movable structure 37 being positioned, as shown in FIG. 1, in a centered position within its permitted range of longitudinal movement, the groove 76, and respective, corresponding grooves of the second, third, and fourth piston structures 73A, 73B, 73C, are aligned with the respective pivot axles 23 of the first, second, third, and fourth fluid amplifiers 21, 21A, 21B, 21C, respectively. More precisely, each groove 76 is bisected by a plane perpendicular to the longitudinal axis of the movable structure 37 and coincident with the axle 23 of the respective, adjacent amplifier 21 and with the fluid nozzle 22 of the respective amplifier when the nozzle is in a centered position and extends perpendicularly of the axis of movable structure 37. First, second, third, and fourth position feedback elements 77, 77A, 77B, 77C are fastened to the jet nozzle pipes 22 of the first, second, third, and fourth fluid amplifiers 21, 21A, 21B, 21C, respectively, for movement with the respective nozzles. Each feedback element 77 is suitably mounted upon a sheet 78 of a light, non-ferrous material such as aluminum, which is fastened to the jet nozzle 22 of the respective amplifier 21, positioned in a plane perpendicular to the pivotal axis of the axle 23 of the respective amplifier 21, and moveably positioned whereby upon the nozzle 22 pivoting on its axle 23, the aluminum sheet 78 is free to move laterally without contacting or interfering with other structure within the amplifier 21 or with the first and second outlets 35, 36. A drain passageway 57, shown diagrammatically, extends between the interior of the amplifier 21 and the piston structure 73 for providing a drainage outlet for the fluid flow through jet pipe nozzle 22.

The feedback elements 77, 77A, 77B, 77C are suitably elongated leaf spring elements, extending toward the adjacent annular grooves 76 of the respective, adjacent piston structures 73, 73A, 73B, 73C when both the jet nozzles 22 and the elongated structure 37 are positioned centrally within their respective ranges of movement as shown in the drawing and as described more fully hereinbelow, and each feedback element is provided on its distal end with a respective, spherical bearing member 79 which is arranged to seat within the annular groove 76 of the respective, adjacent piston structure 73, 73A, 73B, and 73C and to have sliding contact therein with the pistons 74, 75. Communication is provided, through suitable passageways within the first housing segment 27, between the annular grooves 76 of the first elongated member 38 and the first fluid return passageway 69 and, within the second housing segment 28, between the corresponding annular grooves of the second elongated structure 39 and the second return passageway 70.

With respect to the first piston structure 73 as typical, the outboard side surfaces of the first and second pistons 74, 75 define respective, first and second piston faces 80, 81 facing in first and second, opposite directions along the axis of the movable structure 37, or leftwardly and rightwardly as viewed in the drawing. All of the piston face areas 80, 81 of the piston structures 73, 73A, 73B, and 73C is of equal area. Each piston structure 73, 73A, 73B, 73C is slideably and sealingly seated within a respective, corresponding, cylindrical cavity formed within the housing 26, the cylindrical cavities each being divided into first and second chamber portions 82, 83 by the respective, associated piston structures 73, 73A, 73B, 73C, the first and second piston face areas 80, 81 of each piston structure facing and partially defining the first and second chamber portions 82, 83 respectively disposed adjacent the corresponding piston structures 73, 73A, 73B, 73C. With respect again to the first amplifier 21 and piston structure 73 as typical, the first and second chamber portions 83, 84 have communication through the housing 26 with the first and second fluid outlets 35, 36, respectively, of the first amplifier 21 and, through first and second pressure monitoring passageways 85, 86, respectively, with the first monitoring valve 33, to be described hereinbelow.

The portions of the movable structure 37 extending between the first and second piston structures 73, 73A and between the third and fourth piston structures 73B, 73C which lie beyond the respective, adjacent chamber portions 82, 83 are sealingly and slideably related to adjacent portions of the first and second housing segments 27, 28, respectively. As has been previously stated, the first cylindrical portions 55 of the mutually confronting, stepped end portions of the first and second elongated structures 38, 39 are sealingly and slideably fitted within the sleeve member 64. Similarly, tubular bushings 84 are sealingly fitted within corresponding cavities formed within the housing 26 adjacent and outwardly spaced from the first and fourth piston structures 73, 73C for facilitating assembly of the system 26, as will be more fully explained below. A portion of the first elongated structure 38 extending, in the first direction, beyond the first chamber portion 83 adjacent the first piston structure 73 extends sealingly and slideably within one of the tubular gaskets 84; similarly, a portion of the second elongated structure 39 extending, in the second direction, beyond the second chamber portion 83 adjacent the fourth piston structure 73C extends sealingly and slideably within another of the tubular gaskets 84. Thus, the tubular gaskets 84, the sleeve member 64, and portions of the housing 26 extending between the first and second and the third and fourth piston structures 73, 73A and 73B, 73C serve to fluidly isolate the chamber portions 82, 83 adjacent each piston structure 73, 73A, 73B, 73C from those adjacent the other piston structures. Correspondingly, the fluid outlets 35, 36 of each of the fluid amplifiers 21, 21A, 21B, 21C are isolated from those of the other fluid amplifiers, a factor which affords several important advantages over prior art control systems in which several fluid amplifier units have fluid communication with each other, as will become apparent from the description to follow.

The first and second chamber portions 82, 83 adjacent each piston structure 73, 73A, 73B, and 73C are of sufficient width and are appropriately spaced to permit a desired degree of axial movement of the piston structures, and thus of the movable structure 37, as determined by the flow characteristics of the flow control valve 53 and the desired maximum actuator velocity.

For convenience of assembly, each of the elongated structures 38, 39 is suitably divided, at respective locations thereon spaced between the piston assemblies 73, 73A and between the piston assemblies 73A, 73C and as indicated at 87, into two, mutually abutting segments which are continuously maintained in firm contact by the spring 54 with a force which, as has been suggested, also maintains both elongated segments 38, 39 firmly seated against the respective rocker arms 46, 47. First and second removable, externally threaded cup members 88, 89 are sealingly and threadingly engaged within corresponding, internally threaded cavities formed within the housing segments 27, 28, respectively, coaxially of the elongated members 38, 39, respectively. The cup members 88, 89, when threadingly inserted, coaxially and slideably enclose the outer end portions of the first and second elongated members 38, 39, respectively, and serve to facilitate the assembly and maintenance of the movable structure 37.

With additional reference now to FIG. 3, the flow control valve 53, the valve element 52 of which is operatively connected to the movable structure 37 (FIG. 1) by means of the first and second rocker arms 46, 47, is of the known type wherein a movable valve element (52) controls the division of fluid flow from the valve into two outlets. The flow control valve 53 employs a substantially tubular housing 90 which is sealingly mounted within a corresponding cavity within the housing 26. More precisely, the valve housing 90 extends equidistantly within the first and second housing segments 27 and 28 along an axis which is parallel to the longitudinal axis of the summing structure 37 (FIG. 1). With respect to the portion of the flow control valve 53 extending within the first housing segment 27, which portion constitutes a single, flow control valve redundant to and substantially identical to the valve portion extending within the second housing segment 28, there is provided through the valve housing 90 a fluid inlet 91 having communication with the first source of fluid under pressure $P_1$ and first and second fluid outlets 92, 93 which communicate, through conduits 94, 95, respectively, with the interior of the portion of the actuator 11 containing the first piston 12 at respective locations spaced on opposite sides of the first actuator piston 12. The first and second valve outlets 92, 93 are spaced in the first and second directions, respectively, along the length of the valve housing 90 (leftwardly and rightwardly, as viewed in the drawing) from the fluid inlet 91. First and second fluid return passages or orifices 96, 97 are also formed through the valve housing 90, the return passages 96, 97 both having communication with the first fluid return outlet $R_1$. The first return orifice 96 is spaced, in the first direction, beyond the first fluid outlet 92, and the second return orifice 97 is spaced, in the second direction, beyond the second fluid outlet 93.

The valve element 52 is sealingly and slidingly associated along its length with the valve housing 90 but is reduced in diameter along portions of its length which may become adjacent the fluid inlet 91, the outlets 92, 93, and the return orifices 96, 97, during any permitted position of the valve element 52. First and second, mutually spaced, annular lands 98, 99 extend circumferentially around the valve element 52, the first land 98 being positioned between the first return orifice 96 and the inlet 91, and the second land 99 being positioned between the inlet 91 and the second return orifice 97. Upon the movable summing structure 37 (FIG. 1) being positioned in its central position as shown in FIG. 1, the first and second lands 98 and 99 of the valve element 52 are in register with the first and second fluid outlets 92 and 93, respectively, the width of the lands 98, 99 being substantially the same as the diameter of the outlets 92, 93, respectively. The portion of the valve 53 extending within the second housing segment 28 is similarly constructed, and has corresponding outlet conduits 100, 101 communicating with the interior of the actuator 11 on opposite sides of the second piston 13.

From the above description it will be recognized by those in the art that the flow control valve 53 is of a type operable, in response to axial movement of the valve element 52, to control the rate and direction of flow of fluid under pressure through conduits 94 and 95 and through conduits 100, 101, to the actuator 11, thereby controlling the direction and velocity of movement of the duplex piston 14.

With respect now to the operation of the portions of the control system 26 thus far described, as has been previously suggested, the operation of servo system components such as the fluid amplifiers 21, 21A, 21B, 21C, the differential signal amplifiers 19, 19A, 19B, 19C, and the corresponding transducers of the position sensor system 16 (FIG. 3) in response to electrical command signals received from a remote control station is generally known in the art. Summarily, and with respect to the first channel, an electrical signal of a current level which may vary over a predetermined range is supplied to the difference signal amplifier 19 through cable 10. The signal supplied at any given moment corresponds to a position, within a corresponding range of physical movement, at which it is desired to position the actuator piston 14 and its load, which, in the case of the present embodiment and as has been previously stated, may be a movable airfoil or control surface element. An electrical signal corresponding to the current position of the piston 14 is produced by an element of the position sensor 16, suitably by an inductive modification of an externally supplied signal, as occur in the present commercially supplied LVDT sensor 16 previously named, and conducted by feedback wire 18 to the difference signal amplifier 19. The difference signal amplifier 19 compares the feedback signal received from the sensor system 16 with the command signal received via input cable 10 and, if the piston rod 14 is not in the commanded position, difference signal amplifier 19 produces an error signal, or modified command signal, which it electrically amplifies and which is then conducted via output lead 20 to the first fluid amplifier 21. The fluid amplifier 21 is operative, as was previously discussed, to translate the modified command signal received through lead 20 into a corresponding differential pressure signal across its outlets 35, 36 (absent any movement of the summing structure 37) and thus, across the first and second piston face areas 80, 81 of the first piston structure 73. While the operation of only the servo components associated with the first fluid amplifier 21 have been described, it will be understood that the corresponding components associated with the second, third, and fourth fluid amplifiers 21A, 21B, and 21C function similarly to provide redundant, modified command signals to the second, third, and fourth amplifiers.

It will be recalled from the initial discussion of prior-art control systems that it is the electrical components of such systems which are the most susceptible to failures or malfunctions and for which the greatest degree of redundancy must therefore be provided. Thus, a redundancy level of four is incorporated into the system 26 with respect to the fluid amplifiers 21, 21A, 21B, 21C, the difference signal amplifiers 19, 19A, 19B, 19C, and the four-element position sensor system 16, whereas only two operating sections are required for the duplex actuator 11 and for the flow control valve 53, respectively. Assuming that each element of the position sensor system 16, and each of the difference signal amplifiers 19, 19A, 19B, 19C and the fluid amplifiers 21, 21A, 21B, and 21C are functioning properly and that identical, redundant command signals are received by difference signal amplifiers 19, 19A, 19B, and 19C, then the differential fluid pressure produced by each fluid amplifier 21, 21A, 21B, 21C are substantially identical, and each imparts a force upon the summing structure tending to urge it in the same direction, if the commanded position differs from the current position of the actuator piston 14.

Upon the amplifier 21 receiving an electrical command signal moving its nozzle 22 in the first direction, for example, the feedback element 77 flexes and imparts an oppositely directed torque on the nozzle 22 which is proportional to the current level of the electrical signal. Absent the feedback elements 77, 77A, 77B, 77C, since there is relatively little resistance to axial movement of the summing structure 37 and the valve element 52, relatively minor electrical signals to the amplifiers 21, 21A, 21B, 21C would tend to move the nozzle 22 sharply to the extreme rightward or leftward positions, thereby causing sharp, severe movement of the summing structure 37 and valve element 52 which could cause damaging transient pressures within the hydraulic conduits 94, 95, 100, 101 leading to the actuator 11 and/or dangerously severe accelerations of the actuator piston 14 and its load.

Since the summing structure 37 forces all the distal ends of the feedback elements 77, 77A, 77B, 77C to the same relative position within their ranges of movement, the equilibrium position of the summing structure 37 is the average of the positions commanded by the fluid amplifiers 21, 21A, 21B, 21C. With respect to each of the fluid amplifiers 21, 21A, 21B, 21C, the difference between the position commanded by the respective fluid amplifier and the current position of the summing structure 37 creates a differential hydraulic pressure across the respective, corresponding one of the piston structures 73, 73A, 73B, 73C. Because the force required to move the summing structure 37 is negligible in relation to the hydraulic forces involed, the net force caused by a differential pressure across any one of the piston structures 73, 73A, 73B, 73C is substantially balanced by a net differential pressure of an opposite sense across the other, (equally sized) piston structures, provided there is no accelerative movement of the summing structure 37. That is, the forces on the summing structure 37 become balanced as the structure reaches an equilibrium position. The system is thus termed a "force summing" system.

By measuring the differenital pressure across each of the piston structures 73, 73A, 73B, and 73C it can be determined how closely the output signal of each fluid amplifier 21, 21A, 21B, and 21C is tracking the average of all the signals. When one amplifier produces an output signal which differs from the average by a predetermined degree, it thus produces a differential pressure across the corresponding piston structure which exceeds a particular level of differential pressure which may be predetermined in accordance with performance requirements of the system, as will be more fully discussed hereinbelow. Therefore, and according to an important feature of the present invention, the performance of each amplifier 21, 21A, 21B, and 21C, and thus of the corresponding electrical components, respectively associated therewith, may be monitored by measuring the differential pressures across each piston structure 73, 73A, 73B, 73C, or across the outlets 35, 36 of each of the associated fluid amplifiers. This permits the use of individual monitoring valves (33), to be described in the following section, which are fluidly isolated from each other, and thus affords an additional element of redundancy for enhancing the reliability of the system 26.

The differential pressure monitoring valves 33, 33A, 33B, 33C comprise a further, important feature of the invention, each is fluidly connected to a respective, associated supply conduit 32, 32A, 32B, 32C in series between the fluid inlet 34 of the respective, corresponding fluid amplifier 21, 21A, 21B, 21C and the source of fluid under pressure. As will be understood from the description to follow, each monitor valve 33, 33A, 33B, and 33C comprises a means for shutting off fluid flow to the respective, associated fluid amplifier 21, 21A, 21B, 21C upon the occurrence of a differential pressure between the outlets 35, 36 of the respective, associated fluid amplifier which exceeds a predetermined level. While a preferred embodiment of the monitor valves 33 will be described and illustrated in detail, it should be understood that various other types may be employed, such as those incorporating electro-mechanical pressure sensing and/or valving mechanisms, which accomplish the above-stated functions of monitoring differential pressures across the piston structures and controlling fluid flow to the fluid amplifiers.

With additional reference to FIG. 4, the construction of a preferred embodiment of the typical, first monitoring valve 33 will now be described. As will be understood from the description, the monitoring valve 33 performs both the monitoring of differential pressure across the outlets 35, 36 of the fluid amplifier 21 and the valving of the fluid supply thereto within a single, compact unit by a hydromechanical mechanism having only one movable valve element (131).

Figure 4:
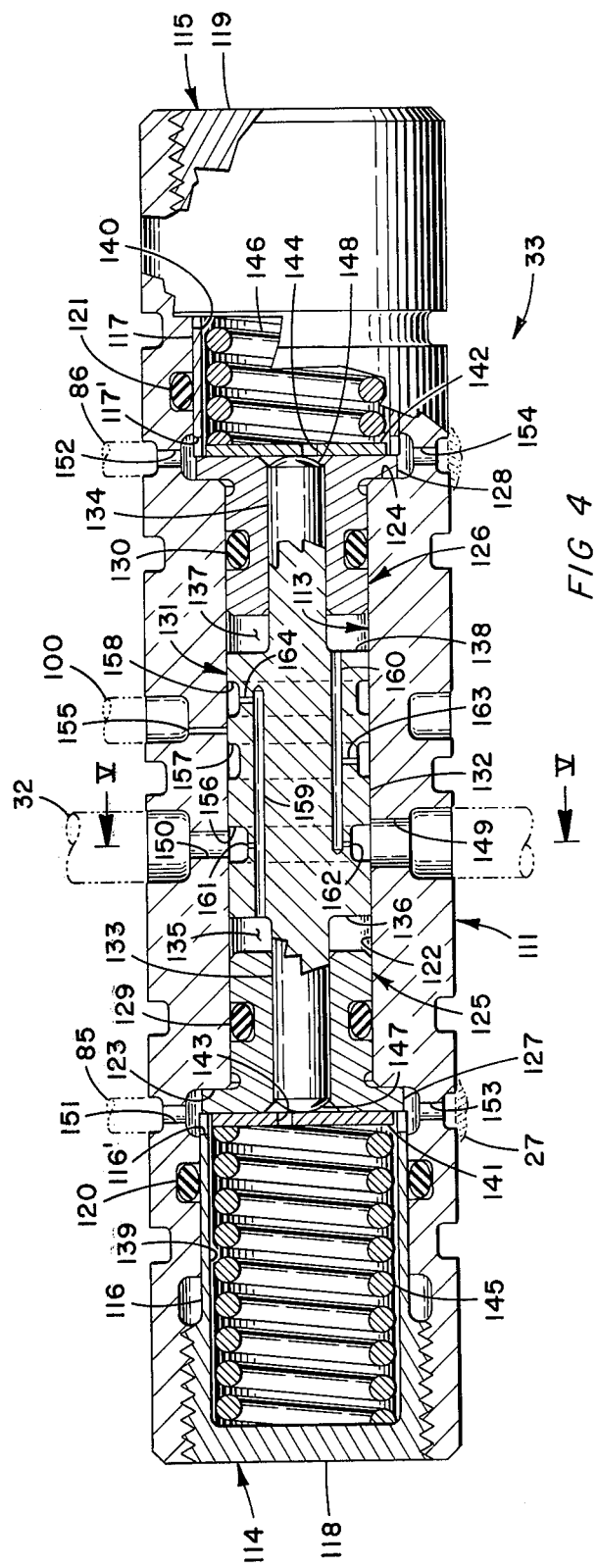
FIG. 4 is a longitudinal, sectional view of one of the monitor valves of FIG. 2 in an enlarged scale.

Referring now to FIG. 4, a monitoring valve 33 constructed according to a preferred embodiment includes a cylindrical, tubular valve housing 111 of the type adapted to be sealingly inserted within a corresponding cavity formed within an outer, systems housing such as the first housing segment 27, fragments only thereof being shown in FIG. 4. The present, illustrative embodiment of the valve 33 is of the type having ports, to be described, positioned along the valve housing 111 in a pattern which corresponds to that of corresponding passageways such as the passageways 32, 85, and 86 formed within the outer, systems housing 27, whereby the valve 33 may be removed from the outer housing 27 for maintenance or as otherwise required, according to practices known in the art.

With continued reference to FIG. 4, the valve housing 111 has a channel or chamber 113 extending axially therethrough. First and second, generally cup-shaped plug members 114, 115 are threadingly engaged with the valve housing 111 within opposite end portions of the chamber 113 and serve to close the respective end portions. The plug members 114, 115 each include a respective, cylindrical sidewall portion 116, 117 extending centrally within the housing chamber 113 from respective, base wall portions 118, 119 extending transversely of the sidewall portions 116, 117 and of the valve housing chamber 113. Each of the plug member sidewalls 116, 117 is externally threaded along a portion of its length which portion is adjacent the respective base wall portion 118, 119, the remaining portion having a smooth-surfaced, cylindrical outer surface. The central end portions of the cup member sidewalls 116, 117 are notched, at 116' and 117', to permit communication between the interiors of the cup members 114, 115 and the ports 151, 152, respectively, to be described hereinbelow. First and second O-ring valve seals 120, 121 are seated within corresponding, annular recesses formed coaxially of the valve housing and within the housing inner wall defining the chamber 113, the recesses and seals 120, 121 being positioned circumferentially around the smooth-surfaced portions of the respective, adjacent sidewalls 116, 117 of the first and second plug members 114, 115 upon the plug members 114, 115 being mounted within the chamber 113, the seals 120, 121 being configured to provide a fluid-sealed relationship between the housing 111 and the respective plug members 114, 115.

The portions of the housing chamber 113 within which the plug members 114, 115 extend are preferably of a greater diameter than the remaining, central portion extending between them, the central portion being defined by a central, cylindrical wall portion 122 of reduced diameter. First and second, annular shoulders 123, 124 extending radially outwardly from the central cylindrical wall portion 122 are thus defined adjacent the respective ends of the central wall portion 122.

First and second, tubular bushings 125, 126 are fixedly seated within the central wall portion 122 of the chamber 113, the bushings 125, 126 having respective, radially outwardly extending head portions 127, 128 disposed adjacent but external the central, cylindrical wall portion 122 and seated against the first and second annular shoulders 123, 124 respectively. The respective surfaces of the bushing head portions 127, 128 facing outwardly of the central wall portion 122 are substantially flat, and extend transversely with respect to the longitudinal axis of chamber 113. Third and fourth, O-ring valve seals 129, 130 are seated within corresponding, annular recesses formed circumferentially of the first and second bushings 125, 126 respectively, and are positioned in sealing association with the central wall portion 122 for ensuring fluid tight seals between the bushings 125, 126 and the housing 111.

A spool type valve member 131 is slideably mounted within the chamber 113, the valve member having a central, spool portion 132 which is machined to provide sliding and substantially sealing association between the outer, cylindrical surface of the spool portion 132 and the central, inner wall portion 122 of the housing 111. The valve member 131 additionally has first and second, substantially cylindrical plungers 133, 134 coaxial of the spool portion 132, projecting outwardly from respective, opposite end portions of the spool portion 132, and extending coaxially within the first and second, tubular bushings 125, 126, respectively. The first and second plungers 133, 134 are machined to fit sealingly and slidingly within the first and second bushings 125, 126 and, in cooperation with the bushings and the third and fourth O-ring seals 129, 130, are thus effective to isolate the portion of the chamber 113 extending the two bushings 125, 126 from the remaining portions disposed beyond the bushings. Thus, a first, annular, chamber portion 135 is defined between the first bushing 125 and the valve member spool 132, the spool 132 having a first, annular piston face area 136 defining one side of the first chamber portion 135 and facing in a first direction or toward the first bushing 125. Similarly, a second, annular, chamber portion 137 is formed between the second bushing 126 and the valve member. The spool 132 has a second, annular, piston face area 138 defining one side of the second chamber portion 137 and facing in a second axial direction or toward the second bushing 126.

Third and fourth chamber portions 139, 140 are formed in the portions of the chamber 113 beyond the bushings 125, 126, the third chamber portion 139 extending from the first bushing 125 to the base wall 118 of the first plug member 114 and the fourth chamber portion 140 extending from the second bushing 126 to the base wall 119 of the second plug member 115.

Within the third and fourth chamber portions 139, 140 are positioned first and second disc members 141, 142, each of a slightly smaller diameter than the inner diameter of the corresponding, adjacent plug member 114, 115, respectively, and each positioned in abutting relationship with the flat, outwardly facing base surface of the respective, adjacent, bushing head portion 127, 128. The first and second disc members 141, 142 have respective central orifices or channels 143, 144 formed therethrough for providing communication between the third and fourth chamber portions 139, 140 and the first and second plungers 133 and 134, respectively. A first coiled spring 145 extends within the third chamber portion, axially of the first plug member 114, and has one end footed against the base wall 118 of the plug member and another end footed against the first disc member 141 to partially compress the spring. A second coiled spring 146 is similarly mounted within the fourth chamber portion 140 and footed between the second disc member 142 and the base wall 119 of the second plug member 115. The first and second coiled springs 145, 146 are of equal spring rates and are compressed by substantially equal amounts, whereby the valve member 131 tends to remain in its centered position provided the springs are not overcome by other forces urging the valve member axially.

Third and fourth piston face areas 147, 148 are defined by the distal end surfaces of the first and second plungers 133, 134, the piston face areas 147, 148 facing in the first and second directions, respectively, and contacting the first and second disc members 141, 142, respectively, upon the disc members abutting against the first and second bushings 127, 128, respectively.

The valve 33 is provided with a first, or inlet port 149 extending through the housing 111 and a second, or outlet port 150 extending through the housing, the inlet and outlet ports suitably being coaxially aligned and bisected by a plane perpendicular to the longitudinal axis of the valve housing 111. The inlet port 149 communicates with the portion of the fluid supply conduit 32 which extends to the source of fluid under pressure 29 (FIGS. 2 and 3) and the outlet port 150 communicates with the portion of the fluid supply conduit 32 extending from the monitoring valve 33 to the fluid amplifier 21 (FIGS. 1 and 2).

Third and fourth ports 151, 152 are also formed through the housing 111 adjacent the head portions 127, 128 of the first and second bushings 125, 126, respectively, the third and fourth ports 151, 152 having communication with the third and fourth chamber portions 139, 140, respectively. In the present embodiment, the third and fourth ports 151, 152 are duplicated by redundant ports 153, 154 positioned diametrically opposite the third and fourth ports 151, 152, respectively. The ports 151, 153 and the ports 152, 151 communicate radially outwardly with respective grooves extending circumferentially around the housing 111, and the redundant ports 153, 154 thus serve to enhance fluid communication between the chambers 139, 140 and the outer, circumferential grooves. In the present embodiment, these circumferential grooves are covered by adjacent portions of the outer, system housing 27 at all portions thereof except the areas adjacent ports 151, 152, at which communication is provided with passageways 85, 86, respectively.

The housing 111 additionally has at least one drain opening 155 formed therethrough and having communication with the chamber 113 at a location along the housing 111 spaced between the second port 150 and the fourth port 152. The drain opening 155 communicates with the fluid return passageway 69 (FIGS. 2 and 3) via a respective drain passageway 100.

Figure 6:
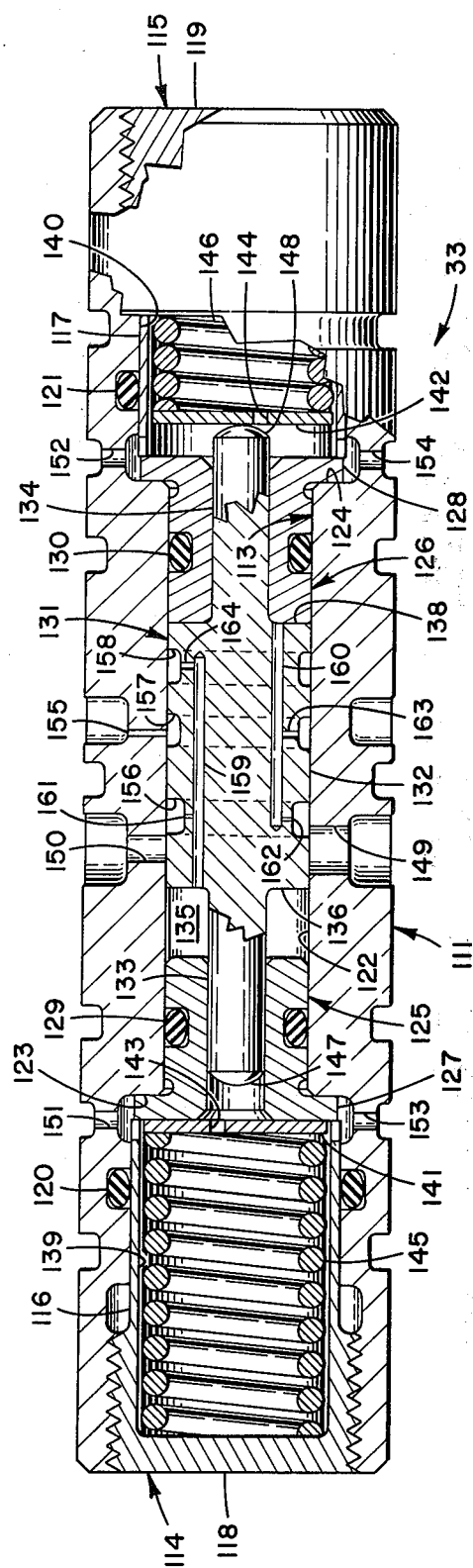
FIG. 6 is a view similar to FIG. 4 showing the valve element of the valve in an alternative position.

First, second, and third annular grooves or annuli 156, 157, 158 are formed circumferentially of the valve portion 132, the first, second, and third annuli being spaced successively along the spool 132 in the second direction, or rightwardly as viewed in FIGS. 4 and 6.

Upon the valve member 131 being positioned with its first and second plungers 133, 134 in contact with the first and second disc members 141, 142, respectively, the disc members 141, 142 are in contact with the first and second bushings 125, 126, respectively, and the spool portion 132 is centrally located between the first and second bushings. When the valve memer 131 is in its centered position, the first annulus 156 is aligned with the first and second ports 149, 150 and thus provides cummunication therebetween. For reasons which will become apparent, the first port 149 is of a diameter greater than the width of the first annulus 156, and the width of the first annulus 156 is greater than the diameter of the second port 150.

A first axial bore 159 extends axially within the spool portion 132, the first axial bore 159 having communication with the first chamber portion 135 and extending, from the first, annular piston face area 136 and in the second direction, within the spool 132 to a location adjacent the third annulus 158. Similarly, a second axial bore 160 extends, in the opposite direction, from the second piston face area 138 to a location within the spool 132 adjacent the first annulus 156.

First and second restrictive passageways 161, 162 communicate between the first annulus 156 and the first and second axial bores 159, 160, respectively. Similarly, a third passageway 163 communicates between the second axial bore 160 and the second annulus 157, and a fourth passageway 164 communicates between the first axial bore 159 and the third annulus 158.

The valve member 131 is axially slideable within the chamber 113 from a position in which its first annular piston face 136 seats against the first bushing 125 to a position, as shown in FIG. 6, in which its second, annular piston face 138 seats against the second bushing 126. For clarity of reference, the above-noted range of movement of the valve member 131 is divided into five positional ranges, consecutive in the second direction or from left to right, as will now be described. In its central, or third positional range, the first annulus 156 is in communication with the first and second ports 149, 150 and thus comprises a passageway communicating between the ports 149, 150. When the valve member spool 132 is centered between the first and second bushings 125, 126, the portion of the spool 132 extending between the second and third annuli 157, 158 is disposed in register with the drain opening 155 and serves to close the drain opening, thus to prevent any loss of fluid through the drain opening 155. Upon the valve member 131 moving in the first (left) direction, the third annulus 158 becomes in register with the drain opening 155. The first and third annuli 156, 158 are positioned in sufficiently close relationship, relative to the spacing and size of the second port 150 and the drain opening 155, to permit the complete closure of the second port 150 by the portion of the spool 132 between the first annulus and the first annular piston face 136 when the valve member is moved in the second direction to the extreme rightward position shown in FIG. 6.

The fourth positional range is defined as that range of positions beginning, as the valve member 132 is moved in the second direction from its third positional range, when the second annulus 157 initially communicates freely with the drain opening 155 and ending when the second port 150 is completely closed by the portion of the spool extending between the first annulus 156 and the first piston face 136. The fifth positional range extends from the latter position to that shown in FIG. 6 wherein the second piston face area 138 of the spool 132 contacts the second bushing 126.

The first port 149 is sufficiently wider than the first annulus 156 to permit some communication therebetween during all relative positions of the valve member 131, even, for example, in the position shown in FIG. 6 wherein the spool 132 abuts against the second bushing 126; similarly, there remains an opening between the first port 149 and the first annulus 156 upon the valve member being moved in the opposite axial direction until the first piston face 136 contacts the first bushing 125.

The second and first positional ranges are defined similarly, but with respect to movement of the spool 132 in the first direction from its third positional range. As the valve member 131 is moved in the first direction through its third positional range, the portion of the spool 132 extending between the second and third annuli 157, 158 remains in covering relationship with the drain opening 155. The second positional range is defined as that range beginning, as the valve member 131 is moved in the first direction from its third positional range, when the third annulus 158 first communicates freely with the drain opening 155 and ending when the second port 150 is completely closed, by the portion of the spool 132 extending between the first and second annuli 156, 157. The first positional range is defined as that beginning at the latter position, wherein the second port 150 is first closed by the spool 132, and ending as the valve 131 is stopped from further movement in the first direction by contact of the first piston face 136 with the first bushing 125.

The valve 33 is thus operable to conduct fluid, from a source, not shown, of fluid under pressure communicating from fluid supply source 29 (FIG. 3) with the first orifice 149, through the first annulus 156 and the second port 150 when the valve member 131 is in its second, third, or fourth positional ranges. As will be described in the paragraphs to follow, the valve 33 is operable to shut off fluid flow therethrough upon the occurrence of a predetermined pressure differential between first and second portions of a fluid system, i.e., between chamber portions 83, 84, or between fluid amplifier outlets 35, 36 (FIG. 1).

The operation of the valve 33 will initially be described with reference to FIG. 4 wherein the valve member 131 is centered within its third positional range. In the description to follow, the movement of the valve member 131 will be described in terms of leftward and rightward movement with reference to the drawing, it being understood that such terminology is employed for clarity of description only and is not meant to limit the valve to a particular configuration or orientation. When the valve member 131 is in its third positional range, fluid flow is permitted from the first to the second ports 149, 150, and from thence conduit 32 to the fluid amplifier 21 (FIG. 1). During normal operation of the fluid amplifier 21, the fluid flow thus received is ejected through jet nozzle 22 partially into outlet 35 and partially into outlet 36 whereby a pressure differential is created across the piston structure 73. The fluid pressure existing within the first chamber portion 82 is transmitted, via conduit 85 and the valve third port 151 (FIG. 4) and through the notched portion 116' of the plug member sidewall 116, to the valve third chamber portion 139, within the first plug member 114. Similarly, fluid pressure within the second chamber portion 83 (FIG. 1) is transmitted through conduit 86 and the valve fourth port 152 (FIG. 4) to the fourth chamber portion 140. Fluid pressure within the third chamber portion 139 is applied to the third piston face area 147, of the first plunger 133, through the opening 143 in the disc member 141. Correspondingly, fluid pressure within the fourth chamber portion 140 exerts a pressure upon the fourth piston face area 148 of the second plunger 134. Because the third and fourth piston face areas 147, 148 are of equal area, it will be apparent that there will be no net force tending to move the piston member 131 axially when equal pressures exist within the third and fourth chamber portions 139, 140. Moreover, the first and second coil springs 145, 146 act to urge continuously the valve member 131 toward its centered position as shown in FIG. 4. Upon the occurrence of a drop in pressure in the second chamber portion 83 (FIG. 1) whereby the pressure within second chamber portion 83 drops below that of first portion 82, however, the pressure differential between first and second chamber portions 82, 83 will be transmitted to the third and fourth ports 151, 152 and will result in a drop in pressure within the fourth chamber portion 140 relative to the pressure within the third chamber portion 139. The differential pressure thus effected within the valve 33 exerts a net force upon the valve member 131 tending to urge it to the right. Any forces tending to move the valve member 131 from its centered position are resisted by one of the first and second springs 145, 146, so that insignificant variances in pressure between chamber portions 82 and 83 (FIG. 1) do not cause any movement of the valve member 131. Assuming, however, that the loss in fluid pressure within second chamber portion 83 (FIG. 1) causes a net fluid pressure differential resulting in a force which is greater than the resistance to rightward movement of the valve member 131 caused by the second spring 146, fluid pressure will then begin to translate the valve member 131 to the right. As the valve member 131 moves to the right, fluid within the valve second, annular chamber portion 137 is caused to flow therefrom and successively through the second axial bore 160, the second restrictive passageway 162, the first annulus 156, the first restrictive passageway 161, and the first axial bore 159, to the first, annular chamber portion 135, the restrictive passageways 161, 162 and the bores 160, 159 thus serving frictionally to resist movement of the valve member 131 with a force proportional to the rate of movement thereof. The bores 159, 160 and the passageways 161, 162, in combination with the first and second chamber portions 135, 137 thus comprise means for preventing movement of the valve member 131 from its third positional range upon the occurrence of transient differential pressures between the third and fourth ports 151, 152 of a level above a predetermined level at which movement of the valve member 131 from its third positional range would ultimately occur but of a duration less than a predetermined time period, for a given pressure level.

Assuming that a substantial, non-transient pressure differential exists which is of a level sufficient to move the valve member 131 to the right against the opposing force of the second spring 146, the valve member 131 then translates to the right, further compressing the spring 146. If the differential pressure is of a value less than the predetermined level at which shut-off of fluid flow is desired, an equilibrium condition will be reached before the valve member 131 leaves its third positional range because of the increased force exerted, at the equilibrium position, by the more fully compressed, second spring 146. If the differential pressure is above the predetermined level, however, the valve member 131 will be translated rightwardly to the fourth positional range (in which the second annulus 157 registers and communicates with the drain opening 155; upon the valve member 131 thus entering the fourth positional range, fluid pressure within the second, annular chamber portion 137 is significantly reduced by the passage of fluid from chamber portion 137 through the second axial bore 160, the third restrictive passageway 163, the second annulus 157, and through the drain opening 155. It will be noted that no such drainage outlet is opened to the first cavity 135, in that the third annulus 158 is then closed by the surrounding wall of the valve housing 111. Both annular chamber portions 135, 137 receive fluid under pressure from the first port 149 through the first annulus 156 and respective ones of the axial bores 159, 160. However, the reduction of pressure within the second chamber portion 137 by fluid flow therefrom through the drainage opening 155 induces a substantial net force upon the valve member 131 serving to urge the valve member 131 to the right through the remainder of the fourth positional range and into the fifth positional range, in which the portion of the spool 132 extending between the first annulus 156 and the valve first, annular piston face area 136 covers the second port 150 and prevents further passage of fluid therethrough. Upon the second port 150 being closed, fluid entering the valve 33 through its first port 149 continues to exert a net force on the valve member 131 urging it to the right, and the valve member 131 is translated to the right until it is stopped by contact of the second piston face 138 with the second bushing 126.

The valve 33 thus remains closed so long as fluid under pressure is received through the first port 149. Upon the excessive differential pressure between chamber portions 82, 83 (FIG. 1) being removed, however, the valve 33 may be reopened by temporarily shutting off fluid flow through the port 149, whereupon the second coil spring 146 acts to move the valve member 131 back to its centered position shown in FIG. 4. Such temporary termination of fluid flow to the valve 33 may be accomplished by actuation of the first remotely controllable shutoff valve 31 (FIG. 2). A normally open, pressure sensing switch 102 (FIG. 1) may be connected to the supply conduit 32 between the valve 33 and the fluid amplifier 21 for closing a circuit to a remote warning light (not shown) when the fluid pressure within the supply conduit 32 is shut off. As will be apparent to those in the art, operation of the monitor valve 33 to shut off fluid flow upon the occurrence of a differential pressure from a loss of pressure in the first chamber portion 82 (FIG. 1) with respect to that in the second chamber portion 83 causes the valve member 131 to move to the left from its third positional range, through its second and into its first range, in the same manner as has been described above with respect to rightward movement. Upon the valve member 131 entering its second positional range, fluid within the first, annular chamber portion 135 is permitted to drain through the first axial bore 159, the passageway 164, and the drainage opening 155.

It will thus be seen that the first and second springs 145, 146 and the third and fourth, piston face areas 147, 148, in cooperation with the first and second disc members 141, 142 and the first and second, tubular bushings 125, 126, comprise a pressure responsive means, responsive to differential pressure between the third and fourth ports 151, 152, and thus, between the first and second chamber portions 82, 83 and between the amplifier outlets 35, 36 (FIG. 1), for constraining the valve member 131 within its third positional range when any difference between the pressure level within the first and second amplifier outlets 35, 36 is below the predetermined amount; for moving the valve member 131 from its third to its second positional range upon the pressure at the amplifier second outlet 36 falling below that in the first outlet 35 by the predetermined amount; and for moving valve member 131 from its third to its fourth positional range upon the pressure in the amplifier first outlet 35 falling below that in the second outlet 36 by the predetermined amount. The differential pressure responsive means also comprises means for moving the valve member 131 from its first to its third positional range and, alternatively, from its fifth to its third positional range, upon fluid flow into the valve 33 through the first port 149 being shut off.

The first and second chamber portions 135, 137, in cooperation with the valve first and second, annular piston face areas 136, 138 and the valve housing 111 and in cooperation with the axial bores 159, 160, the annuli 156, 157, 158, and the restricted passageways 161, 162, 163, 164, provide a latching means, employing fluid pressure, for moving the valve member 131 from its second to its first positional range upon the valve member 131 entering its second positional range when fluid under pressure is received through the first port 149 and, alternatively, for moving the valve member from its fourth to its fifth positional range upon the valve member entering its fourth positional range. The latching means additionally comprises means, actuated by fluid under pressure received through the first port 149, for constraining or "latching" the valve member 131 in its first positional range upon the valve member being moved to its first positional range by the latching means; and, alternatively, for constraining the valve member 131 in its fifth positional range upon the valve member being moved to its fifth positional range by the latching means.

Figure 5:
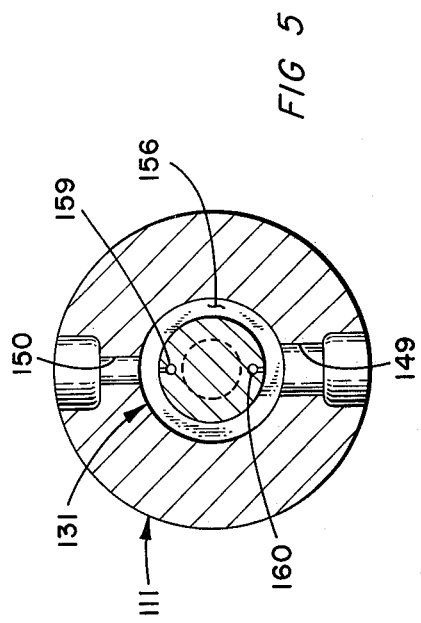
FIG. 5 is a cross-sectional view taken as on line V — V of FIG. 4.

While the valve 33 as thus shown and described represents a preferred embodiment, it will again be recognized by those in the art that various modifications may be made in its construction within the scope of the appended claims. The valve 33 is of the type disclosed in my copending application for U.S. Ser. No. 357,984 filed May 7, 1973, now U.S. Pat. No. 3,823,729, in which application a modification of its construction is described in detail. It will be understood by those in the art that the operating characteristics of the valve 33 may be controlled as desired by appropriate design and sizing of several of its components. Determination of the various dimensions preferred for precise operating results in a particular application necessarily entails an at least partially empirical study. As an example, however, and with reference to the embodiment of FIGS. 4–6, it has been experimentally determined that when the valve 33 is intended to receive fluid under a pressure of approximately 3,000 psi through its inlet port 149; is intended to shut off fluid flow upon the occurrence of a pressure differential of 60% of a maximum differential pressure of 2,250 psi available between ports 151 and 152 from amplifier 21; and wherein operation of the valve to shut off fluid flow is desired to occur within a time of about 0.036 seconds (and in which it is desired to move the valve member 136 to its second or fourth position within 0.025 seconds) following the initiation of a continuous, 60% pressure differential, the following design parameters are satisfactory: plungers (133, 134) of .163 inch diameters, spool diameter of about 0.390 inches, valve element (131) total axial movement of 0.2 inches, and total movement, within its third positional range, of 0.064 inches, drain orifice (155) diameter of 0.017 inches, restrictive, first and second passageways (161, 162) of 0.015 inch diameters, and coiled springs 145, 146 having spring rates of about 51 pounds/inch and pre-load of 24.4 pounds. Reduction of the respective diameters of the passageways 161, 162 and/or the drain opening 155 would increase the time of response, while increasing those diameters would decrease the time of response.

It will thus be seen that the fluid monitoring and control valve 33 provides an efficient yet practicable means for shutting off fluid flow to the amplifier 21 upon the occurrence of a pressure differential above a predetermined level between the fluid outlets 35, 36 of the amplifier. The valve 33 comprises a means for continuously monitoring the difference in pressure between two fluid outlets 35, 36 and includes means for positively latching the valve 33 in an off position (in its first or fifth position) so long as fluid under pressure is received through the first port 149. The valve is of rugged, durable construction, having only one major movable part.

The valve members 31 and 131 are not connected to the summing structure as in some prior-art systems, and the operation of each monitoring valve is thus functionally independent of movement of the summing structure, whereby operation of the monitoring valves occurs in response to pressure differentials across the piston structures rather than changes in the positions of the piston structures.

The present invention thus provides a majority voting, multiple channel control system in which each channel is fluidly isolated, and whereby failures or leakages from particular channels are isolated from and do not affect the remaining channels. Because of the force-summing technique wherein a single, movable summing structure is employed, only small displacements of the movable structure are required, and the fluid amplifier units can be of quite small and light construction. The fact that each piston structure 73 is fluidly isolated from the others permits the use of the discrete, differential pressure monitoring valves 33 and thus avoids the problems, previously discussed, related to the complexity of cross-channel monitoring apparatus. Morevoer, the preferred use of jet pipe, electrohydraulic valves avoids the necessity of multiple valving to isolate and/or to bypass a failed tranducer. That is, the fluid channels passing between the chamber portions 82, 83 and through the fluid amplifier 21 via outlets 35, 36, for example, include no restrictive orifices or the like which would frictionally oppose fluid flow therethrough and thus impart a passive resistance to axial movement of the movable structure 38; and thus, no failure-responsive bypass system is needed between chamber portions 82, 83. Again because of the fluid isolation of the channels and the use of the rapidly functioning, discrete monitoring valves, deactivation of failed channels occurs within a small fraction of a second, and spurious transient signals caused by failures, and transients which could be caused by deactivation of particular channels, are minimized. The use of the differential pressure monitoring technique permits the use of monitoring valves whose threshold (e.g., 60% of maximum differential pressure) is substantial, thus obviating the problem of channel shutdowns because of spurious, transient pressure changes.

While only one embodiment of the invention, together with modifications thereof, has been described in detail herein and shown in the accompanying drawing, it will be evident that various further modifications are possible in the arrangement of its components without departing from the scope of the invention.

What is claimed is:

1. A fluid powered servo control system responsive to a plurality of redundant, command input signals and comprising:
   a source of fluid under pressure;
   a plurality of conduits communicating with the source of fluid under pressure;
   a plurality of fluid amplifiers each operative in response to a respective command signal, each having a fluid inlet connected to a respective one of the conduits and first and second fluid outlets, and each comprising means receiving fluid from the source of fluid under pressure and ejecting fluid proportionally through the two outlets in response to a respective command signal to cause a differential pressure output signal across the outlets, the fluid outlets of each fluid amplifier being fluidly isolated from the outlets of the other fluid amplifiers;

a housing;

a movable structure slideably mounted within the housing and comprising means summing the output signals of the fluid amplifiers, the movable structure having a plurality of pairs of piston face areas, each pair corresponding to a respective fluid amplifier, each piston face area comprising means for receiving fluid pressure from a respective one of the fluid amplifier outlets; and a plurality of differential pressure monitoring means, each monitoring means being connected to the piston face areas of a respective one of the pairs of piston face areas and responsive to any differential pressure thereacross, each monitoring means being connected to a respective one of the conduits in series between the source of fluid under pressure and the corresponding fluid amplifier and comprising a means, functionally independent of the movement of the movable summing structure, for shutting off fluid flow to the respective fluid amplifier upon the occurrence of a differential pressure, between the outlets of the respective fluid amplifier, which exceeds a predetermined level.

2. The apparatus of claim 1, each fluid amplifier comprising an electrohydraulic transducer means producing a differential fluid pressure which, absent corresponding movement of the movable structure, corresponds to an input command which comprises a variable electrical signal.

3. The apparatus of claim 1, further comprising a flow control valve having a movable valve element, the movable summing structure being operatively connected to the movable element of the flow control valve.

4. The apparatus of claim 1, each differential pressure monitoring means comprising:

a valve housing having a chamber and having, in communication with the chamber, first, second, third, and fourth ports and at least one drain opening, the third and fourth ports having communication with the respective outlets of the corresponding, associated fluid amplifier, the first port communicating with the source of fluid under pressure and the second port communicating with the fluid inlet of the respective fluid amplifier;

a valve member slideably mounted within the valve housing chamber and movable therein within first, second, third, fourth, and fifth positional ranges, the valve member having a passageway which communicates between the first and second ports upon the valve member being positioned within its third positional range, the valve member having valving means for shutting off fluid flow between the first and second ports upon the valve member being positioned within its first positional range and, alternatively, upon the valve member being positioned within its fifth positional range;

pressure responsive means, responsive to any differential pressure between the first and second fluid outlets of the respective, associated fluid amplifier, for constraining the valve member within its third positional range when any difference between the pressure level within the fluid amplifier first outlet and the second outlet is below a predetermined amount, for moving the valve member from its third to its second positional range upon the pressure in the first outlet falling below that in the second outlet by the predetermined amount, and for moving the valve member from its third to its fourth positional range upon the pressure within the second outlet falling below that in the first outlet by the predetermined amount; and latching means, for moving the valve member from its second to its first positional range upon the valve member entering its second positional range, and for moving the valve member from its fourth to its fifth positional range upon the valve member entering its fourth positional range.

5. The apparatus of claim 4, the pressure responsive means including means for moving the valve member from its first to its third positional range and, alternatively, from its fifth to its third positional range, upon fluid flow into the valve through the first port being shut off.

6. A fluid powered servo control system responsive to a plurality of redundant, command input signals and comprising:

a source of fluid under pressure;

a plurality of conduits communicating with the source of fluid under pressure;

a plurality of fluid amplifiers each operative in response to a respective command signal, each having a fluid inlet connected to a respective one of the conduits and first and second fluid outlets, and each comprising means receiving fluid from the source of fluid under pressure and ejecting fluid proportionally through the two outlets in response to a respective command signal to cause a differential pressure output signal across the outlets, the fluid outlets of each fluid amplifier being fluidly isolated from the outlets of the outer fluid amplifiers;

a housing;

a movable structure slideably mounted within the housing and comprising means summing the output signals of the fluid amplifiers, the movable structure having a plurality of pairs of piston face areas, each pair corresponding to a respective fluid amplifier, each piston face area comprising means for receiving fluid pressure from a respective one of the fluid amplifier outlets; and a plurality of differential pressure monitoring means, each monitoring means having fluid communication with each piston face area of a respective one of the pairs of piston face areas, each monitoring means being connected to a respective one of the conduits in series between the source of fluid under pressure and the corresponding fluid amplifier and comprising a means, functionally independent of the movement of the movable summing structure, for shutting off fluid flow to the respective fluid amplifier upon the occurrence of a differential pressure, between the outlets of the respective fluid amplifier, which exceeds a predetermined level.

* * * * *